(12) United States Patent
Maekawa et al.

(10) Patent No.: US 7,485,688 B2
(45) Date of Patent: Feb. 3, 2009

(54) WATER AND OIL PRODUCING COMPOSITION

(75) Inventors: Takashige Maekawa, Ichihara (JP);
Shuichiro Sugimoto, Yokohama (JP);
Minako Shimada, Yokohama (JP);
Kyouichi Kaneko, Yokohama (JP);
Harutaka Naruse, Osaka (JP); Yuuichi Nakajima, Kyoto (JP)

(73) Assignee: Asahi Glass Company, Limited, Tokyo (JP)

( * ) Notice: Subject to any disclaimer, the term of this patent is extended or adjusted under 35 U.S.C. 154(b) by 60 days.

(21) Appl. No.: 11/524,918

(22) Filed: Sep. 22, 2006

(65) Prior Publication Data

US 2007/0015867 A1    Jan. 18, 2007

Related U.S. Application Data

(63) Continuation of application No. PCT/JP2005/004833, filed on Mar. 17, 2005.

(30) Foreign Application Priority Data

Mar. 23, 2004 (JP) .............................. 2004-084517

(51) Int. Cl.
*C08F 118/00* (2006.01)

(52) U.S. Cl. ................. 526/245; 524/529; 524/543; 524/554; 526/242

(58) Field of Classification Search ................. 526/245, 526/242; 524/529, 543, 554
See application file for complete search history.

(56) References Cited

U.S. PATENT DOCUMENTS

| | | | | |
|---|---|---|---|---|
| 5,247,008 A | * | 9/1993 | Michels et al. ............... | 524/544 |
| 5,558,940 A | * | 9/1996 | Michels et al. ............... | 428/422 |
| 5,578,688 A | | 11/1996 | Ito et al. | |
| 5,688,309 A | | 11/1997 | Shimada et al. | |
| 6,096,827 A | * | 8/2000 | Lee et al. .......................... | 525/72 |
| 6,177,531 B1 | | 1/2001 | Shimada et al. | |
| 6,207,777 B1 | | 3/2001 | Shimada et al. | |
| 6,251,984 B1 | | 6/2001 | Shimada et al. | |
| 6,271,283 B1 | | 8/2001 | Shimada et al. | |
| 6,376,592 B1 | | 4/2002 | Shimada et al. | |
| 6,395,821 B1 | | 5/2002 | Shimada et al. | |
| 6,590,035 B2 | | 7/2003 | Shimada et al. | |
| 6,610,775 B1 | | 8/2003 | Oharu et al. | |
| 6,624,268 B1 | | 9/2003 | Maekawa et al. | |
| 6,653,376 B2 | | 11/2003 | Sugimoto et al. | |
| 6,716,944 B2 | | 4/2004 | Maekawa et al. | |
| 6,767,946 B2 | | 7/2004 | Shimada et al. | |
| 6,860,926 B2 | | 3/2005 | Ishikawa et al. | |
| 6,872,324 B2 | | 3/2005 | Maekawa et al. | |
| 6,933,338 B2 | | 8/2005 | Sugimoto et al. | |
| 2005/0267241 A1 | * | 12/2005 | Sugimoto et al. ............ | 524/366 |
| 2006/0005317 A1 | | 1/2006 | Hashimoto et al. | |
| 2007/0015867 A1 | | 1/2007 | Maekawa et al. | |

FOREIGN PATENT DOCUMENTS

| | | | |
|---|---|---|---|
| DE | 4426536 A1 | * | 2/1996 |
| DE | 4426537 A1 | * | 2/1996 |
| EP | 195714 A1 | * | 9/1986 |
| JP | 61-236806 | | 10/1986 |
| JP | 5-271351 | | 10/1993 |
| JP | 7-76645 | | 3/1995 |
| JP | 7-206942 | | 8/1995 |
| JP | 8-59751 | | 3/1996 |
| JP | 9-67417 | | 3/1997 |
| JP | 9-183962 | | 7/1997 |
| JP | 10-237133 | | 9/1998 |
| JP | 2000-109703 | | 4/2000 |
| WO | WO 00/43462 | | 7/2000 |

OTHER PUBLICATIONS

U.S. Appl. No. 09/734,570, filed Dec. 13, 2000, Shimada et al.
U.S. Appl. No. 08/217,101, filed Mar. 24, 1994, Ito et al.
U.S. Appl. No. 12/039,218, filed Feb. 28, 2008, Asada et al.

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, P.C.

(57) ABSTRACT

The present invention provides a water and oil proofing composition which imparts excellent water and oil resistance and comprises a fluorocopolymer comprising polymerized units of $(Z-Y)_n X$ (wherein Z: a $C_{1-6}$ perfluoroalkyl group or the like, Y: an alkylene group or the like, n: 1 or 2, X: a polymerizable unsaturated group), polymerized units of $CH_2=CR^1$-G-$(R^2O)_q$-$R^3$ (wherein $R^1$: a hydrogen atom or the like, $R^2$: a $C_{2-4}$ alkylene group or the like, q: an integer of from 1 to 50, G: —COO$(CH_2)_r$— (r: an integer of from 0 to 4), $R^3$: a hydrogen atom or the like, and polymerized units of $CH_2=CR^4$-M-Q-$NR^5R^6$ (wherein $R^4$: a hydrogen atom or the like, Q: a $C_{2-4}$ alkylene group or the like, $R^5$ and $R^6$: $C_{1-8}$ alkyl groups or the like) and an aqueous medium.

12 Claims, No Drawings

WATER AND OIL PRODUCING COMPOSITION

TECHNICAL FIELD

The present invention relates to a water and oil proofing composition which imparts water and oil resistance to various articles, particularly to a water and oil proofing composition for paper and non-woven fabric.

BACKGROUND ART

Herein, acrylates and methacrylates are collectively referred to as (meth)acrylates. (Meth)acryloyl group is a similar reference.

Water and oil proofings containing a fluorocopolymer comprising polymerized units based on an $R^f$ group-containing monomer which forms a homopolymer having a melting point attributable to crystallites of polyfluoroalkyl groups (hereinafter referred to as $R^f$ groups) (hereinafter also referred to as an $R^f$ group-containing crystalline polymer) have been proposed.

As the fluorocopolymer, a quaternary fluorocopolymer comprising polymerized units based on an acrylate having a perfluoroalkyl group (hereinafter referred to as an $R^F$ group), polymerized units based on stearyl (meth)acrylate, polymerized units based on 2-chloroethyl vinyl ether and polymerized units based on N-methylol(meth)acrylamide (Patent Document 1), a quaternary fluorocopolymer comprising polymerized units based on an acrylate having an $R^F$ group, polymerized units based on a (meth)acrylate having an alkyl group or the like, polymerized units based on an acrylate having a polyoxyalkylene group and polymerized units based on an acrylate having a dialkylamino group (Patent Document 2) or a quaternary fluorocopolymer comprising polymerized units based on a (meth)acrylate having an $R^F$ group, polymerized units based on a (meth)acrylate having an alkylamino group, polymerized units based on a vinyl carboxylate or an alkyl vinyl ether and polymerized units based on another monomer other than the aforementioned three (Patent Document 3) may be mentioned.

However, most of them use $R^F$ group-containing (meth)acrylates having a carbon number of 8 or above. $R^F$ group-containing (meth)acrylates having a carbon number of from 1 to 6 have not been industrially utilized fully.

Patent Document 1: JP-A-10-237133
Patent Document 2: JP-A-5-271351
Patent Document 3: JP-A-7-206942

DISCLOSURE OF THE INVENTION

The Problems that the Invention is to Solve

The object of the present invention is to provide a water and oil proofing composition based on a (meth)acrylate having a $C_{1-6}$ $R^f$ group which imparts excellent water and oil resistance to articles.

MEANS OF SOLVING THE PROBLEMS

The present invention provides a water and oil proofing composition having a fluorocopolymer dispersed in an aqueous media, wherein the fluorocopolymer comprises 60 to 98 mass % of polymerized units based on the following monomer (a), from 1 to 20 mass % of polymerized units based on the following monomer (b) and from 1 to 30 mass % of polymerized units based on the following monomer (c):

monomer (a): a compound represented by $(Z-Y)_nX$,
wherein
Z: a $C_{1-6}$ perfluoroalkyl group or a group represented by $C_mF_{2m+1}O(CFWCF_2O)_dCFKW-$ (wherein m is an integer of from 1 to 6, d is an integer of from 1 to 4, and each of W and K is independently a fluorine atom or $-CF_3$),
Y: a bivalent organic group or a single bond,
n: 1 or 2, and
X: a polymerizable unsaturated group provided that when n is 1, X is $-CR=CH_2$, $-COOCR=CH_2$, $-OCOCR=CH_2$, $-OCH_2-\phi-CR=CH_2$ or $-OCH=CH_2$, and when n is 2, X is $=CH(CH_2)_pCR=CH_2$, $=CH(CH_2)_pCOOCR=CH_2$, $=CH(CH_2)_pOCOCR=CH_2$ or $-OCOCH=CHCOO-$ (wherein R is a hydrogen atom, a methyl group or a halogen atom, $\phi$ is a phenylene group, and p is an integer of from 0 to 4), monomer (b): a compound represented by $CH_2=CR^1-G-(R^2O)_q-R^3$,
wherein
$R^1$: a hydrogen atom or a methyl group,
$R^2$: a $C_{2-4}$ alkylene group or an otherwise $C_{2-3}$ alkylene group in which some or all of the hydrogen atoms have been replaced by hydroxyl groups,
q: an integer of from 1 to 50,
G: $-COO(CH_2)_r-$ or $-COO(CH_2)_t-NHCOO-$ (wherein r is an integer of from 0 to 4, and t is an integer of from 1 to 4), and
$R^3$: a hydrogen atom, a methyl group, a (meth)acryloyl group or an allyl group, monomer (c): a compound represented by $CH_2=CR^4-M-Q-NR^5R^6$ or $CH_2=CR^4-M-Q-N(O)R^5R^6$,
wherein
$R^4$: a hydrogen atom or a methyl group,
M: $-COO-$ or $-CONH-$,
Q: a $C_{2-4}$ alkylene group or an otherwise $C_{2-3}$ alkylene group in which some or all of the hydrogen atoms have been replaced by hydroxyl groups, and
each of $R^5$ and $R^6$: a benzyl group, a $C_{1-8}$ alkyl group or an otherwise $C_{2-3}$ alkylene group in which some of the hydrogen atoms have been replaced by hydroxyl groups, or $R^5$ and $R^6$ may form a morpholino group, a piperidino group or a pyrrolidinyl group, together with a nitrogen atom.

The present invention also provides the water and oil proofing composition wherein the fluorocopolymer further comprises polymerized units based on the following monomer (d), and comprises from 60 to 97.9 mass % of polymerized units based on the monomer (a), from 1 to 20 mass % of polymerized units based on the monomer (b), from 1 to 20 mass % of polymerized units based on the monomer (c) and from 0.1 to 10 mass % of polymerized units based on the monomer (d):

monomer (d): a monomer other than the monomer (b) and the monomer (c), which is a (meth)acrylate having at least one functional group selected from the group consisting of an isocyanato group, a blocked isocyanato group, a urethane bond, an alkoxysilyl group, an epoxy group, an N-methylol group and an N-alkoxymethyl group and having no $R^f$ groups.

Effects of the Invention

The water and oil proofing composition of the present invention has effects such as providing excellently water and oil proof substrates with excellent flexibility when applied to the substrates, excellent adhesion to substrates, durable water and oil resistance, developing even on creases in paper, excellent coating ability on substrates, excellent substrate penetrability.

BEST MODE FOR CARRYING OUT THE INVENTION

The monomer (a) in the present invention is a compound represented by $(Z-Y)_nX$.

Z in $(Z-Y)_nX$ is a $C_{1-6}$ $R^F$ group or a group represented by $C_mF_{2m+1}O(CFWCF_2O)_dCFK—$ (wherein m is an integer of from 1 to 6, d is an integer of from 1 to 4, and each of W and K is independently a fluorine atom or $—CF_3$). Z is preferably a $C_{1-6}$ $R^F$ group, more preferably $F(CF_2)_2—$, $F(CF_2)_3—$, $F(CF_2)_4—$, $F(CF_2)_5—$, $F(CF_2)_6—$ or $(CF_3)_2CF(CF_2)_2—$, particularly preferably $F(CF_2)_4—$, $F(CF_2)_5—$ or $F(CF_2)_6—$.

Y is a bivalent organic group or a single bond. Y is preferably a bivalent organic group, more preferably a bivalent group represented by $—R^M\text{-}T\text{-}R^N—$ (wherein each of $R^M$ and $R^N$ is independently a single bond or a $C_{1-22}$ saturated or unsaturated hydrocarbon group which may contain one or more ether oxygen atoms, and T is a single bond, $—OCONH—$, $—CONH—$, $—SO_2NH—$, $—SO_2NR'—$ (wherein R' is a $C_{1-6}$ alkyl group) or $—NHCONH—$). Y is preferably a $C_{1-10}$ alkylene group, $—CH=CHCH_2—$, $—(CH_2CHR''O)_jCH_2CH_2—$ (wherein j is an integer of from 1 to 10, and R'' is a hydrogen atom or a methyl group), $—C_2H_4OCONHC_2H_4—$, $—C_2H_4OCOOC_2H_4—$ or $—COOC_2H_4—$, more preferably a $C_{1-10}$ alkylene group, particularly preferably $—CH_2—$, $—CH_2CH_2—$, $—(CH_2)_{11}—$ or $—CH_2CH_2CH(CH_3)—$.

X is a polymerizable unsaturated group. When n is 1, X is $—CR=CH_2$, $—COOCR=CH_2$, $—OCOCR=CH_2$, $—OCH_2\text{-}\phi\text{-}CR=CH_2$ or $—OCH=CH_2$, and when n is 2, X is $=CH(CH_2)_pCR=CH_2$, $=CH(CH_2)_pCOOCR=CH_2$, $=CH(CH_2)_pOCOCR=CH_2$ or $—OCOCH=CHCOO—$ (wherein R is a hydrogen atom, a methyl group or a halogen atom, $\phi$ is a phenylene group, and p is an integer of from 0 to 4). X is preferably $—OCOCR=CH_2$ or $—OCOCH=CHCOO—$, more preferably $—OCOCR=CH_2$ with a view to attaining a high solubility in solvents to facilitate emulsion polymerization. In view of polymerizability, R is preferably a hydrogen atom, a halogen atom (such as a fluorine atom or a chlorine atom) or a $C_{1-3}$ alkyl group, more preferably a methyl group.

The monomer (a) is preferably 3,3,4,4,5,5,6,6,7,7,8,8,8-tridecafluorooctyl methacrylate or 3,3,4,4,5,5,6,6,6-nonafluorohexyl methacrylate.

The monomer (b) in the present invention is a compound represented by $CH_2=CR^1\text{-}G\text{-}(R^2O)_q—R^3$.

$R^1$ is a hydrogen atom or a methyl group, $R^3$ is a hydrogen atom, a methyl group, a (meth)acryloyl group or an allyl group, and $R^2$ is a $C_{2-4}$ alkylene group or an otherwise $C_{2-3}$ alkylene group in which some or all of the hydrogen atoms have been replaced by hydroxyl groups. The compound may contain alkylene groups with different carbon numbers. When the monomer (b) contains alkylene groups with different carbon numbers in $—(R_2O)_q—$, the repeating units may be arranged in blocks or at random. q is an integer of from 1 to 50, preferably from 1 to 30, more preferably from 1 to 15. G is $—COO(CH_2)_r—$ or $—COO(CH_2)_t—NHCOO—$ (wherein r is an integer of from 0 to 4, and t is an integer of from 1 to 4).

$R^3$ is preferably a (meth)acryloyl group, $R^2$ is preferably a $C_{2-4}$ alkylene group, and G is preferably $—COO(CH_2)_r—$ (wherein r is an integer of from 0 to 4). When $R^3$ is a (meth)acryloyl group, the fluorocopolymer tends to firmly adhere to substrate by forming a three-dimensional network structure, thereby improving the durability. As the monomer (b), a compound wherein $R^3$ is a (meth)acryloyl group and a compound wherein $R^3$ is a hydrogen atom are preferably used in combination.

The monomer (b) is preferably 2-hydroxyethyl (meth)acrylate, 2-hydroxypropyl (meth)acrylate, 2-hydroxybutyl (meth)acrylate, 4-hydroxybutyl (meth)acrylate, polyoxyethylene glycol mono(meth)acrylate, polyoxypropylene glycol mono(meth)acrylate, methoxypolyoxyethylene glycol (meth)acrylate, trioxyethylene glycol di(meth)acrylate, tetraoxyethylene glycol di(meth)acrylate, polyoxyethylene glycol di(meth)acrylate, acryloyloxypolyoxyethylene glycol methacrylate, 2-hydroxy-3-acryloyloxypropyl (meth)acrylate, poly(oxypropylene-oxybutylene) glycol di(meth)acrylate, poly(oxyethylene-oxypropylene) glycol di(meth)acrylate or poly(oxyethylene-oxybutylene) glycol di(meth)acrylate.

The monomer (b) is more preferably polyoxyethylene glycol mono(meth)acrylate, 2-hydroxyethyl (meth)acrylate, 2-hydroxypropyl (meth)acrylate, 2-hydroxybutyl (meth)acrylate, 4-hydroxybutyl (meth)acrylate, trioxyethylene glycol di(meth)acrylate, tetraoxyethylene glycol di(meth)acrylate, polyoxyethylene glycol di(meth)acrylate or poly(oxyethylene-oxypropylene) glycol di(meth)acrylate, particularly preferably polyoxyethylene glycol mono(meth)acrylate, 2-hydroxyethyl (meth)acrylate, 4-hydroxybutyl (meth)acrylate, trioxyethylene glycol di(meth)acrylate, tetraoxyethylene glycol di(meth)acrylate, poly(oxyethylene-oxypropylene) glycol di(meth)acrylate or polyoxyethylene glycol di(meth)acrylate.

The monomer (c) in the present invention is a compound represented by $CH_2=CR^4\text{-}M\text{-}Q\text{-}NR^5R^6$ or $CH_2=CR^4\text{-}M\text{-}Q\text{-}N(O)R^5R^6$.

$R^4$ is a hydrogen atom or a methyl group, M is $—COO—$ (an ester bond) or $—CONH—$ (an amide bond), Q is a $C_{2-4}$ alkylene group or an otherwise $C_{2-3}$ alkylene group in which some or all of the hydrogen atoms have been replaced by hydroxyl groups, and each of $R^5$ and $R^6$ is a benzyl group, a $C_{1-8}$ alkyl group or an otherwise $C_{2-3}$ alkylene group in which some of the hydrogen atoms have been replaced by hydroxyl groups, or $R^5$ and $R^6$ may form a morpholino group, a piperidino group or a pyrrolidinyl group, together with a nitrogen atom.

M is preferably $—COO—$, Q is preferably a $C_{2-4}$ alkylene group, and $R^5$ and $R^6$ are preferably $C_{1-8}$ alkyl groups.

The monomer (c) is preferably N,N-dimethylaminoethyl (meth)acrylate, N,N,-diethylaminoethyl (meth)acrylate, N,N-dimethylaminopropyl (meth)acrylate, N,N-diethylaminopropyl (meth)acrylate, N,N-diisopropylaminoethyl (meth)acrylate, N,N-diethylaminopropyl (meth)acrylamide, , N-(meth)acryloylmorpholine N-(meth)acryloylpiperidine or N,N-dimethylaminooxide ethyl (meth)acrylate, more preferably N,N-dimethylaminoethyl (meth)acrylate or N,N,-diethylaminoethyl (meth)acrylate.

The fluorocopolymer in the present invention is preferably a fluorocopolymer obtained by polymerizing 3,3,4,4,5,5,6,6,7,7,8,8,8-tridecafluorooctyl methacrylate or 3,3,4,4,5,5,6,6,6,-nonafluorohexyl methacrylate as the monomer (a), polyoxyethylene glycol mono(meth)acrylate, 2-hydroxyethyl (meth)acrylate, 2-hydroxypropyl (meth)acrylate, 4-hydroxybutyl (meth)acrylate, triethylene glycol di(meth)acrylate, tetraethylene glycol di(meth)acrylate or polyoxyethylene glycol di(meth)acrylate as the monomer (b), and N,N-dimethylaminoethyl methacrylate, N,N-diethylaminoethyl methacrylate or N,N-diethylaminooxide ethyl methacrylate as the monomer (c).

The fluorocopolymer in the present invention preferably comprises from 70 to 90 mass % of polymerized units based on the monomer (a), from 4 to 20 mass % of polymerized units based on the monomer (b) and from 8 to 25 mass % of polymerized units based on the monomer (c). Paper treated with the fluorocopolymer having such a composition shows excellent water and oil resistance both on planes and on creases. The fluorocopolymer adheres well to paper.

The fluorocopolymer in the present invention preferably further comprises polymerized units based on the following monomer (d).

monomer (d): a monomer other than the monomer (b) and the monomer (c), which is a (meth)acrylate having at least one functional group selected from the group consisting of an isocyanato group, a blocked isocyanato group, a urethane bond, an alkoxysilyl group, an epoxy group, an N-methylol group and an N-alkoxymethyl group and having no $R^f$ groups.

As the monomer (d), the following compounds are preferred.

Compounds Having an Isocyanato Group:

2-Isocyanatoethyl (meth)acrylate, 3-isocyanatopropyl (meth)acrylate and 4-isocyanatobutyl (meth)acrylate.

Compounds Having a Blocked Isocyanato Group:

The 2-butanone oxime adduct of 2-isocyanatoethyl (meth)acrylate, the pyrazole adduct of 2-isocyanatoethyl (meth)acrylate, the 3,5-dimethylpyrazole adduct of 2-isocyanatoethyl (meth)acrylate, the 3-methylpyrazole adduct of 2-isocyanatoethyl (meth)acrylate, the ε-caprolactam adduct of 2-isocyanatoethyl (meth)acrylate, the 2-butanone oxime adduct of 3-isocyanatopropyl (meth)acrylate, the pyrazole adduct of 3-isocyanatopropyl (meth)acrylate, the 3,5-dimetgylpyrazole adduct of 3-isocyanatopropyl (meth)acrylate, the 3-methylpyrazole adduct of 3-isocyanatopropyl (meth)acrylate, the ε-caprolactam adduct of 3-isocyanatopropyl (meth)acrylate, the 2-butanone oxime adduct of 4-isocyanatobutyl (meth)acrylate, the pyrazole adduct of 4-isocyanatobutyl (meth)acrylate, the 3,5-dimethylpyrazole adduct of 4-isocyanatobutyl (meth)acrylate, the 3-methylpyrazole adduct of 4-isocyanatobutyl (meth)acrylate and the ε-caprolactam adduct of 4-isocyanatobutyl (meth)acrylate.

Compounds Having a Urethane Bond:

Triallyl isocyanurate, the tolylene diisocyanate adduct of 3-phenoxy-2-hydroxypropyl acrylate, the hexamethylene diisocyanate adduct of 3-phenoxy-2-hydroxypropyl acrylate and the hexamethylene diisocyanate adduct of pentaerythritol triacrylate.

Alkoxysilyl Compounds:

Compounds represented by $CH_2=CH^{10}$-D-E-$SiR^aR^bR^c$ (wherein D is —OCO—, —COO— or a single bond, E is a $C_{1-4}$ alkylene group, each of $R^a$, $R^b$ and $R^c$ is independently a $C_{1-6}$ alkyl group or a $C_{1-6}$ alkoxy group, $R^{10}$ is a hydrogen atom or a methyl group) such as 3-methacryloyloxypropyltrimethoxysilane, 3-methacryloyloxypropyldimethoxymethylsilane, 3-methacryloyloxypropyltriethoxysilane, 3-methacryloyloxypropyldiethoxyethylsilane and vinyltrimethoxysilane.

Compounds Having an Epoxy Group:

Glycidyl (meth)acrylate and polyoxyalkylene glycol monoglycidyl ether (meth)acrylate.

Compounds Having an N-methylol Group or an N-alkoxymethyl Group:

N-Methylol(meth)acrylamide, N-methoxymethyl(meth)acrylamide, N-ethoxymethyl(meth)acrylamide and N-butoxymethyl(meth)acrylamide.

The monomer (d) is preferably the 3,5-dimethylpyrazole adduct of 2-isocyanatoethyl (meth)acrylate, 3-methacryloyloxypropyltrimethoxysilane, 3-methacryloyloxypropyldimethoxymethylsilane, 3-methacryloyloxypropyltriethoxysilane or 3-methacryloyloxypropyldiethoxyethylsilane.

Two more species of the monomer (d) may be used. Inclusion of polymerized units based on the monomer (d) in the fluorocopolymer improves oil and water resistance and water repellency.

When the fluorocopolymer contains polymerized units based on the monomer (d), the fluorocopolymer preferably comprises from 60 to 97.9 mass % of polymerized units based on the monomer (a), from 1 to 20 mass % of polymerized units based on the monomer (b), from 1 to 20 mass % of polymerized units based on the monomer (c) and from 0.1 to 10 mass % of polymerized units based on the monomer (d), particularly preferably comprises from 70 to 90 mass % of polymerized units based on the monomer (a), from 4 to 20 mass % of polymerized units based on the monomer (b), from 8 to 25 mass % of polymerized units based on the monomer (c) and from 0.2 to 10 mass % of polymerized units based on the monomer (d).

In the present invention, in order to improve the physical properties of the fluorocopolymer such as bonding and adhesion to substrates and abrasion resistance, the fluorocopolymer may further comprise polymerized units based on a monomer other than the monomers (a) to (d) (referred also to as an additional monomer). The ratio of polymerized units based on the additional monomer in the fluorocopolymer is preferably at most 30 mass %, more preferably at most 15 mass %.

As the additional monomer, ethylene, vinylidene chloride, vinyl chloride, vinylidene fluoride, vinyl acetate, vinyl propionate, vinyl isobutanoate, vinyl isodecanoate, vinyl stearate, cetyl vinyl ether, dodecyl vinyl ether, isobutyl vinyl ether, ethyl vinyl ether, 2-chloroethyl vinyl ether, styrene, α-methylstyrene, p-methylstyrene, (meth)acrylamide, N,N-dimethyl(meth)acrylamide, diacetone (meth)acrylamide, methylolated diacetone (meth)acrylamide, vinyl alkyl ketone, butadiene, isoprene, chloroprene, benzyl (meth)acrylate, (meth)acrylates having a polysiloxane, ally acetate, N-vinylcarbazole, maleimide, N-methylmaleimide and the like are preferably mentioned.

As the additional monomer, vinyl chloride, vinyl acetate, vinyl propionate or vinylidene chloride is preferred to give a water and oil proofing composition with good film forming property and water resistance.

The fluorocopolymer in the present invention is obtainable by polymerization in a solvent by ordinary methods. As the solvent, a ketone (such as acetone, methyl ethyl ketone or methyl isobutyl ketone), an alcohol (such as isopropyl alcohol), an ester (such as ethyl acetate or butyl acetate), an ether (such as diisopropyl ether), an aliphatic or aromatic hydrocarbon, a halogenated hydrocarbon (such as perchloroethylene, trichloro-1,1,1-ethane, trichlorotrifluoroethane or dichloropentafluoropropane), dimethylformamide, N-methylpyrrolidone-2, butyroacetone, DMSO, glycol ether or its derivative is preferably used without any particular restrictions.

As the solvent, a solvent which forms an azeotrope with a relatively low-boiling solvent or water is preferred to facilitate the operations in the subsequent steps, and acetone, 2-propyl alcohol, methyl isobutyl ketone, methyl ethyl ketone, propylene glycol monomethyl ether, dipropylene glycol monomethyl ether or a mixture thereof is preferred. In the polymerization forming the fluorocopolymer, the total monomer concentration in the solvent is preferably from 5 to 60 mass %, more preferably from 10 to 40 mass %.

In the polymerization forming the fluorocopolymer, a polymerization initiator is preferably used. As the polymerization initiator, a peroxide such as benzyl peroxide, lauryl peroxide, succinyl peroxide, tert-butyl perpivalate or an azo compound is preferred. The concentration of the initiator in the solvent is preferably from 0.1 to 1.5 mass %, based on the total amount of the monomers.

As the polymerization initiator, the following polymerization initiator (e) is preferred because it is excellent in polymerizability and highly safe.

Polymerization initiator (e): an azo compound or an azoamidine compound which, itself or when decomposed, has an acute oral toxicity of at least 1000 mg/kg in rats or mice and a 10-hour half-life temperature of 30° C. or above.

The polymerization initiator (e) is preferably 2,2'-azobis-2-methylbutyronitrile (LD50: 1316 mg/kg, 10-hour half-time temperature: 67° C.), dimethyl 2,2'-azobisisobutyrate (LD50: 2369 mg/kg, 10-hour half-time temperature: 65° C.), 2,2'-azobis[2-(2-imidazolin-2-yl)propane] (LD50: 2000 mg/kg or above, 10-hour half-time temperature: 61° C.), 2,2'-azobis(4-methoxy-2,4-dimethylvaleronitrile) (LD50: 2900 mg/kg, 10-hour half-time temperature: 30° C.), 1,1'-azobis(2-cyclohexane-1-carbonitrile) (LD50: 11800 mg/kg, 10-hour half-time temperature: 88° C.), 2,2'-azobis(2,4-dimethylvaleronitrile) (LD50: 6000 mg/kg, 10-hour half-time temperature: 51° C.), 1,1-azobis(1-acetoxy-1 -phenylethane) (LD50: 5000 mg/kg or above, 10-hour half-time temperature: 61° C.), dimethyl azobisisobutyrate (LD50: 2000 mg/kg or above, 10-hour half-time temperature: 68° C.) or the like, more preferably dimethyl 2,2'-azobisisobutyrate or 2,2'-azobis[2-(imidazolin-2-yl)propane].

It is preferred to use a chain transfer agent in the polymerization in order to adjust the degree of polymerization (molecular weight) of the fluorocopolymer. The chain transfer agent is preferably an alkyl mercaptan such as tert-dodecyl mercaptan, n-dodecyl mercaptan or stearyl mercaptan, aminoethanethiol, mercaptoethanol, 2,4-diphenyl-4-methyl-1-pentene, carbon tetrachloride or the like. The chain transfer agent is used preferably in an amount of from 0.05 to 1 mass % based on the total amount of the monomers used in the polymerization.

The reaction temperature for the polymerization is preferably within the range of from room temperature to the boiling temperature of the reaction mixture, particularly the half-life temperature or above, more preferably from 30 to 90° C.

Conversion of an amino group in the resulting fluorocopolymer into an amine salt is preferred and improves storage stability. For the conversion into an amine salt, an acid, especially an acid having a dissociation constant or a first dissociation constant of at least $10^{-5}$, is preferably used. As the acid, hydrochloric acid, hydrobromic acid, a sulfonic acid, nitric acid, phosphoric acid, acetic acid, formic acid, propionic acid, lactic acid or the like is preferred, and acetic acid is particularly preferred.

Instead of conversion into an amine salt using an acid, an amino group in the fluorocopolymer may be converted (or quaternized) into a quaternary ammonium salt by using methyl iodide, ethyl iodide, dimethyl sulfate, diethyl sulfate, benzyl chloride, trityl phosphate, methyl p-toluenesulfonate or the like.

The water and oil proofing composition of the present invention is a dispersion of the fluorocopolymer in an aqueous medium. The fluorocopolymer preferably has a particle size of at most 30 nm, more preferably at most 20 nm, particularly preferably at most 10 nm. In the case of internal sizing (i.e., the water and oil proofing composition is added to the pulp during stock preparation), particles of the fluorocopolymer with particle sizes of at most 10 nm are retained well in the paper to provide excellent properties such as durable water and oil resistance.

The aqueous medium preferably contains the solvent used for the polymerization and is particularly preferably water or a mixture of water with propylene glycol monomethyl ether or dipropylene glycol monomethyl ether in view of handling, health and safety The concentration of the fluorocopolymer in the water and oil proofing composition of the present invention is preferably from 1 to 50 mass %, particularly preferably from 10 to 30 mass %, in relation to the aqueous medium. The concentration at the time of application to a substrate is appropriately selected depending on the substrate and the application method, but is preferably from 0.05 to 10 mass %, particularly preferably from 0.1 to 5 mass %.

The water and oil proofing composition of the present invention may contain a crosslinking agent and a catalyst to improve the adhesion to the substrate by forming crosslinks between them. As the crosslinking agent, a condensate or precondensate of urea or melamine with formaldehyde, methylol-dihydroxyethylene-urea or a derivative thereof, urone, methylol-ethylene-urea, methylol-propylene-urea, methylol-triazone, a dicyandiamide-formaldehyde condensate, methylol carbamate, methylol(meth)acrylamide, a polymer thereof, divinyl sulfone, polyamide or a cationic derivative thereof, an epoxy derivative such as glycidyl glycerol, a halide derivative such as (epoxy-2,3-propyl)trimethylammonium chloride or N-methyl-N-(epoxy-2,3-propyl)morpholinium chloride, a pyridinium salt of ethylene glycol chloromethyl ether, cationic oxidized starch or amphoteric starch or the like is preferably mentioned.

The water and oil proofing composition of the present invention may contain various additives. Among the additives are organic or inorganic fillers such as talc, kaolin, calcium carbonate and titanium dioxide, carriers such as starch, dextrin and polyvinyl alcohol, holding agents, flocculants, buffers, bactericides, biocides, sequestrants, sizing agents such as ASA (anhydrous alkenyl succinate) and AKD (alkyl ketene dimer), fixing agents such as dimethylamine-epichlorohydrin copolymers, polyethyleneimine and poly-diallyl-dimethylammonium chloride, penetrants such as polyoxyalkylene alkyl ether, polyoxyalkylene alkenyl ether, acetylene glycol, polyoxyalkylene acetylene glycol ether and alkylamine oxides, wetting agents, latex stabilizers. Polyoxyethylene acetylene glycol ether is preferred.

The polyoxyethylene acetylene glycol ether is preferably a compound represented by the following formula 1 or 2.

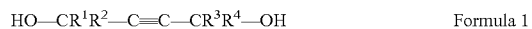

$$HO-CR^1R^2-C{\equiv}C-CR^3R^4-OH \qquad \text{Formula 1}$$

$$HO-CR^5R^6-C{\equiv}C-H \qquad \text{Formula 2}$$

$R^1, R^2, R^3, R^4, R^5$ and $R^6$ in the formulae 1 and 2 may be the same or different and are hydrogen atoms or alkyl groups, respectively.

The alkyl groups in the formulae 1 and 2 are preferably linear or branched $C_{1-12}$ alkyl groups, particularly linear or branched $C_{6-12}$ alkyl groups. Specifically, methyl groups, ethyl groups, propyl groups and isobutyl groups are preferred.

More specifically, a compound represented by the following formula 3 is preferred.

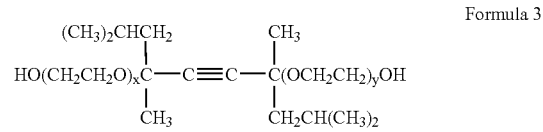

Formula 3

$$\text{HO}(CH_2CH_2O)_x\underset{\underset{CH_3}{|}}{\overset{\overset{(CH_3)_2CHCH_2}{|}}{C}}-C{\equiv}C-\underset{\underset{CH_2CH(CH_3)_2}{|}}{\overset{\overset{CH_3}{|}}{C}}(OCH_2CH_2)_y\text{OH}$$

In the formula 3, the number x+y of moles of ethylene oxide added is preferably from 1 to 50.

The substrate to be used in the present invention is not particularly restricted, but is preferably paper, paper board, cellulose or regenerated cellulose woven or nonwoven fabric, natural fibers, synthetic fibers or the like, particularly paper, paperboard or nonwoven fabric. Inorganic or organic powder such as silica, alumina, talc, sericin or resin powder is preferred as well. Such powder may be used for manufacture of cosmetics and the like.

Treatment of a substrate with the water and oil proofing composition of the present invention is preferably coating or impregnation by spraying, brushing or padding or through a size press or rollers and is preferably followed by drying at room temperature or above and, if necessary, by heating. Drying and heating provide more excellent water and oil resistance.

Treatment of paper with the water and oil proofing composition is preferably provided by wet end or internal sizing, or by external sizing (i.e., by applying the water and oil proofing composition after sheet formation to impart water and oil resistance to the paper sheet).

EXAMPLES

Now, the present invention will be further described with reference to Examples (Examples 1 to 22) and Comparative Examples (Examples 23 to 30). In the respective Examples, performance evaluations were carried out as follows. Unsized paper (ADVANTEC 4A 95 g/m$^2$, 15 cm×25 cm) was used as the base paper. In "pet food test 2", unbleached kraft paper (grammage 75 g/m$^2$, A4 size) was used. The results are tabulated, and "–" indicates not examined.

[Preparation of Test Specimens by External Sizing]

Test solutions were prepared by adjusting the aqueous dispersions obtained in the Examples or commercial products to a solid content of 0.5 mass %. 200 g of the test solutions were applied to the base paper at a wet pickup of 70% by means of a size press and dried at 105° C. for 1 minute under heating, or at 60° C. for 1 minute under heating in the case of low-temperature treatment, or at 100° C. for 40 seconds under heating in "pet food test 2", to give test specimens. The concentrations and pickups of the test solutions are shown in Table 18.

[Kit Test]

Oil resistance was evaluated in accordance with TAPPI T559 cm-02 method and expressed by kit numbers shown in Table 1 on such a scale that the higher the kit number, the better the oil resistance.

A test specimen was placed on a flat and clean, black-colored surface, and a drop of the mixed solution with Kit No. 12 was cast down onto the specimen from a height of 13 cm, and 15 seconds later (contact time: 15 seconds), wiped off with clean blotting paper, and the paper surface under the drop of the mixed solution was examined with the naked eye. If the surface became dark, the same procedure was repeated with the mixed solution with Kit No. 11. If the surface did not become dark, the paper was considered to have pass the test. The kit number of this solution was assigned as the rating.

TABLE 1

| Kit No. | Mixing Ratio (vol %) | | |
|---|---|---|---|
| | Castor oil | Toluene | n-heptane |
| 1 | 100 | 0 | 0 |
| 2 | 90 | 5 | 5 |

TABLE 1-continued

| Kit No. | Mixing Ratio (vol %) | | |
|---|---|---|---|
| | Castor oil | Toluene | n-heptane |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

The kit test is widely for evaluation of the oil resistance of paper since it is capable of giving in a very short time (15 seconds) an estimation of the oil resistance of paper in function of the surface tension. Esible animal and vegetable oils generally have surface tensions of at least 25 mN/m, which is equivalent to that of the mixed solutions with Kit Nos. 6-7, and a rating at a kit number of 7 or above is supposed to be equal to oil resistance to edible oils.

[Salad Oil Test]

Resistance to an edible vegetable oil called "salad oil" was evaluated for evaluation under more practical use conditions.

A 5 cm×5 cm test specimen was folded along a diagonal to make a crease and then folded along the other diagonal to the opposite side to make another crease. About 0.5 mL of salad oil was applied to the intersection of the creases, and the test specimen was kept in an oven at 60° C. for 15 hours. After the specimen was taken out of the oven, the salad oil was wiped from the specimen, and the test specimen was examined for penetration of the salad oil with the naked eye.

The paper was rated on such a five-grade scale that ○ indicates no stain, Δ indicates an uneven stain, X indicates a solid stain under the salad oil, X X indicates a stain spreading over half the surface of the test specimen, and X X X indicates a stain spreading over the entire surface of the test specimen.

[Hot Salad Oil Test]

Evaluation was done by following the procedure in the salad oil test except that the oven conditions were changed to 100° C. for 15 hours. The test was done for evaluation under severe use conditions, for example, during deep frying or in microwave ovens.

[Mixed Oil Test]

Evaluation was done by following the procedure in the salad oil test except that "salad oil containing 20 mass % of oleic acid" was used instead of the salad oil. Generally, fats and oils are mainly composed of fatty acids as fatty acid triglycerides, which liberate fatty acids as the fats and oils degrade. In this test, oleic acid was chosen as a typical fatty acid for evaluation against degraded oil.

[Chicken Oil Test]

Evaluation was done by following the procedure in the salad oil test except that "chicken oil" was used instead of salad oil, "creaseless test specimens" were used as the test specimens, and the oven conditions were changed to "60° C. for 2 hours" to evaluate oil resistance to animal edible oil.

[Ralston Purina Test (RP-2)]

Test specimens (10×10 cm) were maintained at a relative humidity of 50±2% at 23° C. for 24 hours before use. A test specimen was slightly folded along both diagonals, and the creases were reinforced with a roll having a weight of 2040±45 g, a diameter of 9.5 cm and a width of 4.5 cm, covered with a 0.6 cm-thick rubber layer of controlled hardness, at a roll speed of 2-3 cm/s. The creased test specimen was laid on an uncoated paper sheet with a grid of 100 small squares printed thereon.

A metal ring having a diameter of 7.5 cm was placed on the test specimen, and a metal pipe (height 2.5 cm, internal diameter 2.5 cm) was placed through the ring. 5 g of sand (Ottawa sand, 20-30 mesh) was poured into the pipe, and the pipe was removed so as to form a sand cone in the middle of the test specimen. Then, 1.3 mL of a colored oil supplied by Ralston Purina containing 0.1% by weight of a red dye was added to the sand cone from a syringe, and the test specimen was kept with the sand containing the dye in an oven at a relative humidity of 50±2% at 60° C. for 24 hours.

The test specimen was taken out of the oven with the sand, and the grid surface was examined with the naked eye for stains with the colored oil. Each stained small square represented a fraction of the paper surface equal to 1%. The test specimen was considered to be acceptable (○) if the stained area was 2% or less of the grid surface. The ratings were obtained by averaging quadruplicate results.

The test was carried out to evaluate the resistance of antigrease paper for pet food packaging to penetration of oil.

[Pet Food Test]

Evaluation using real pet food was done. Test specimens obtained by using test solutions adjusted to a solid content of 1.0 mass %.

An uncoated paper underlay (ADNANTEC filter paper 1, 10 cm×10 cm) was placed on the surface of a flat metal plate, and an uncoated paper sheet (4A, 10 cm×10 cm) with a grid of 100 small squares printed thereon and then a test specimen (10 cm×10 cm) were laid over. Then, a stainless steel ring with a diameter of 7.22 cm and a height of 2.54 cm was placed on the test specimen, and 20 g of cat food (PURINA, product name: FRYSKIES) was loaded into the ring. Further, a stainless steel cone having a diameter of 7.20 cm and a weight of 1452.5 g was put on the pet food in the ring, and the whole was kept in a thermohygrostat at a temperature of 60° C. and a humidity of 70% RH for 24 hours.

The whole was taken out of the thermohygrostat, and the pet food and the test specimen were removed. The grid surface of the uncoated paper sheet was examined with the naked eye. The rating was expressed in terms of the number of stained squares among 100 squares of the grid. The fewer the stained squares, the better the rating was.

[Pet Food Test 2]

Test specimens obtained by treating unbleached kraft paper with test solutions adjusted to a solid content of 0.6 mass %, 1.0 mass % or 1.2 mass %, optionally containing 1 mass % of polyvinyl alcohol (product name: KURARAY POVAL 117, hereinafter referred to as PVA) or 1 mass % of oxidized starch (manufactured by MEISEI CHEMICAL WORKS, LTD., product name: MS-3600) with or without polyoxyethylene acetylene glycol ether (manufactured by Air Products and Chemicals, Inc., product name: Surfynol 440, an adduct of an average of 3.5 moles of ethylene oxide, hereinafter referred to as S440, or Air Products and Chemicals, Inc., product name: Surfynol 465, an adduct of an average of 10 moles of ethylene oxide, hereinafter referred to as S465).

An uncoated paper underlay (ADNANTEC filter paper 1, 10 cm×10 cm) was placed on the surface of a flat metal plate, and an uncoated paper sheet (4A, 10 cm×10 cm) with a grid of 100 small squares printed thereon and then a test specimen (10 cm×10 cm) with crisscross creases pressed under a load of 2 kg were laid over. Then, a stainless steel ring with a diameter of 7.22 cm and a height of 2.54 cm was placed on the test specimen, and about 40 mL of cat food (original chicken manufactured by IAMS, ground in a laboratory mill, with a crude fat content of at least 21%) was loaded into the ring. Further, a stainless steel cone having a diameter of 7.20 cm and a weight of 1452.5 g was put on the pet food in the ring, and the whole was kept in a thermohygrostat at a temperature of 60° C. and a humidity of 65% RH for 15 hours.

The whole was taken out of the thermohygrostat, and the pet food and the test specimen were removed. The grid surface of the uncoated paper sheet was examined with the naked eye. The rating was expressed in terms of the number of stained squares among 100 squares of the grid. The fewer the stained squares, the better the rating was.

[Water Resistance Test]

The stockigt sizing degree (unit: sec) was evaluated (in accordance with JIS P-8122). The larger the value, the better the water resistance.

[Water Repellency Test]

Water repellency was evaluated (in accordance with JAPAN TAPPI test methods for paper and pulp No. 68:2000 on the scale shown in Table 2). The larger the value, the better the water repellency.

TABLE 2

| Water repellency | Results |
|---|---|
| R0 | A streak with a constant width was left. |
| R2 | A wet streak slightly narrower than the water droplet was left. |
| R4 | A discontinuous streak apparently narrower than the water droplet was left. |
| R6 | The trail was half wet. |
| R7 | ¼ of the trail was wet with long water droplets. |
| R8 | Spherical small droplets were scattered over ¼ or more of the trail. |
| R9 | Spherical water droplets were sparsely scattered on the trail. |
| R10 | The water droplet completely rolled down. |

[Preparation of Test Papers by Internal Sizing and Their Evaluation]

A pulp containing LBKP (=bleached hardwood kraft pulp)/NBKP (=bleached softwood kraft pulp) in a 7/3 mass ratio with a freeness of 400 mL c.s.f was adjusted to a solid content of 1.0 mass % and formed by hand into a paper sheet having a basis weight of about 50 g/cm$^2$ by means of a paper machine and dried at 100° C. for 100 seconds over a drum dryer to give test specimens (c.s.f. stands for Canadian Standard Freeness, which is the unit of the amount of water drained from 1000 mL of an aqueous pulp dispersion through a predetermined filtration machine).

The resulting test specimens were evaluated in the same manner as those obtained by external sizing. The results are shown in Table 15.

[Evaluation of Adhesion (Extractability)]

Test solutions adjusted to a solid content of 2 mass % with deionized water were prepared. Uncoated paper sheets (50 cm×16 cm) were dipped in 200 g of test solutions by size-press at a 70% wet pick-up and dried at 105° C. for 1 minute to give test specimens.

A test specimen was folded back and forth alternately at 2.5 cm intervals into pleats and put in a heat-resistant wide-mouthed bottle (250 mL) together with 250 mL of a solvent mixture of water and ethanol (90/10 vol %) as a food-simulating liquid and kept at 90° C. for 2 hours. The remaining food-simulating liquid was poured into a weighed platinum crucible and kept in a natural convection oven at 120° C. for 2 days until it evaporated to dryness. The crucible was allowed to cool to room temperature in a desiccator and weighed on a precision balance to determine the extracted treating agent, and the extractability was calculated from the following formula. The results are shown in Table 16.

Extractability [%] from treated paper=[((measured) extraction (g) from test specimen−extraction (g) from uncoated paper (actual blank value))/calculated pick-up (g) of the treating agent]×100

Calculated pick-up (g) of the treating agent=mass (g) of the test paper×concentration (%) of the test solution×wet pick-up (%)

[Test for Mechanical Stability]

Test solutions adjusted to a solid content of 1 mass % with deionized water were used. 300 g of the test solutions were heated to 40° C., then stirred for 5 minutes with a mixer at 2500 rpm and filtered through black doeskin cloth, and the cloth was examined with the naked eye for the reminder on the cloth and rated on a 5-grade scale from 5 for no reminder to 1. A figure accompanied with - means that the rating is little short of the figure.

Example 1

A 1 L glass reactor was loaded with 112.5 g of $C_6F_{13}C_2H_4OCOC(CH_3)=CH_2$ (purity 99.6%, hereinafter referred to as C6FMA(a)), 15 g of $CH_2=C(CH_3)COO(C_2H_4O)_nH$ (n is 8 on average, hereinafter referred to as MAEO8(b)), 22.5 g of N,N-diethylaminoethyl methacrylate (hereinafter referred to as DEAEMA(c)), 450 g of methyl isobutyl ketone (hereinafter referred to as MIBK) and 1.2 g of 2,2'-azobis[2-(2-imidazolin-2-yl)propane] (hereinafter referred to as AIP), and the atmosphere was replaced by nitrogen repeatedly three times. Polymerization was carried out at 65° C. for 16 hours with stirring at 350 rpm to give a pale yellow solution having a solid content of 24.2%.

100 g of the pale yellow solution was mixed with 180 g of water and 1.76 g of acetic acid and ultrasonically emulsified and dispersed for 15 minutes. MIBK was distilled off under reduced pressure at 65° C., and the resulting clear pale orange aqueous dispersion was adjusted with deionized water to a solid content of 20 mass %.

Example 2

A 1 L glass reactor was loaded with 112.5 g of C6FMA(a), 14.5 g of MAEO8(b), 1.5 g of $CH_2=C(CH_3)COO(C_2H_4O)_nCOC(CH_3)=CH_2$ (n is 8 on average, hereinafter referred to as 2MAEO8(b)), 22.5 g of DEAEMA(c), 360 g of MIBK, 90 g of 2-propanol (hereinafter referred to as IPA) and 1.2 g of 2,2'-azobis[2-(2-imidazolin-2-yl)propane] (hereinafter referred to as AIP), and polymerization was carried out in the same manner as in Example 1 to give a pale yellow solution having a solid content of 24.2%.

100 of the pale yellow solution was mixed with water and acetic acid in the same manner as in Example 1, stirred with a homomixer for 1 minute and mixed with a high pressure emulsifier (manufactured by APV) at a pressure of 400 bar. MIBK was distilled off at 65° C. under reduced pressure, and the resulting clear pale yellow aqueous dispersion was adjusted with deionized water to a solid content of 20 mass %.

Example 3

A 1 L glass reactor was loaded with 112.5 g of C6FMA(a), 12.9 g of MAEO8(b), 17.1 g of DEAEMA(c), 7.5 g of 2-hydroxyethyl methacrylate (hereinafter referred to as HEMA (b)), 450 g of acetone and 1.2 g of dimethyl 2,2'-azobisisobutyrate (hereinafter referred to as DAIB), and polymerization was carried out I the same manner as in Example 1 to give a pale yellow solution having a solid content of 24.2%.

100 of the pale yellow solution was mixed with water and acetic acid in the same manner as in Example 1 and stirred with a homomixer for 30 minutes. Acetone was distilled off at 65° C., and the resulting clear pale yellow aqueous dispersion was adjusted with deionized water to a solid content of 20 mass %.

Examples 4 to 22

Aqueous dispersions having a solid content of 20 mass % and the compositions (unit: parts by mass) shown in Tables 3, 4 and 5 were prepared in the same manner as in Examples 1 to 3.

TABLE 3

| | Ex. | | | | | | |
|---|---|---|---|---|---|---|---|
| | 4 | 5 | 6 | 7 | 8 | 9 | 10 |
| C4FMA(a) | — | — | — | — | — | — | 74 |
| C6FMA(a) | 75 | 80 | 75 | 75 | 75 | 75 | — |
| MAEO8(b) | 8.6 | 5 | 8.6 | — | 8.6 | — | — |
| MAEO9(b) | — | — | — | 10 | — | — | 10 |
| MAEO5PO2(b) | — | — | — | — | — | 10 | — |
| DEAEMA(c) | 11.4 | 15 | 11.4 | 15 | 11.4 | 15 | — |
| DMAEMA(c) | — | — | — | — | — | — | 15 |
| HEA(b) | 5 | — | — | — | — | — | — |
| HEMA(b) | — | — | — | — | 4 | — | — |
| HBA(b) | — | — | 5 | — | — | — | — |
| 2MAEO8(b) | — | — | — | — | — | — | 1 |
| TMSiMA(d) | — | — | — | — | 1 | — | — |
| DAIB | 0.8 | 0.8 | — | — | 0.8 | — | — |
| AIP | — | — | 0.8 | 0.8 | — | 0.8 | 0.8 |
| Acetone | 300 | — | — | — | — | — | — |
| MIBK | — | 300 | 240 | 240 | 300 | 240 | 240 |
| IPA | — | — | 60 | 60 | — | 60 | 60 |

TABLE 4

| | Ex. | | | | | | | |
|---|---|---|---|---|---|---|---|---|
| | 11 | 12 | 13 | 14 | 15 | 16 | 17 | 18 |
| C6FMA(a) | 75 | 75 | 75 | 75 | 75 | 75 | 76 | 76 |
| MAEO8(b) | 7.8 | — | 6 | 5 | — | — | — | — |
| MAEO9(b) | — | 10 | — | — | — | — | — | — |
| IEO12M(b) | — | — | — | — | 5 | 10 | — | — |
| DEAEMA(c) | 11.4 | 15 | 13 | 13 | 13 | 15 | 12 | 12 |
| HEMA(b) | — | — | 5 | 5 | 5 | — | 11 | 11 |
| 2MAEO14(b) | — | — | 1 | — | — | — | — | — |
| 2MAEO8(b) | 0.8 | — | — | — | — | — | — | — |
| 2MAEO4(b) | — | — | — | — | — | — | 1 | — |
| 2MAEO3(b) | — | — | — | — | — | — | — | 1 |
| 2AEE(b) | — | — | — | 2 | 2 | — | — | — |
| Vac(other) | 5 | — | — | — | — | — | — | — |
| DAIB | 0.8 | — | — | — | — | — | 0.8 | 0.8 |
| AIP | — | 0.8 | 0.8 | 0.8 | 0.8 | 0.8 | — | — |
| MIBK | — | 240 | 240 | 240 | 240 | 240 | — | — |
| IPA | — | 60 | 60 | 60 | 60 | 60 | — | — |
| Acetone | — | — | — | — | — | — | 300 | 300 |

TABLE 5

|  | Ex. | | | |
| --- | --- | --- | --- | --- |
|  | 19 | 20 | 21 | 22 |
| C4FMA(a) | — | — | — | 15 |
| C6FMA(a) | 75 | 75 | 75 | 60 |
| MAEO8(b) | 8 | — | — | 9 |
| DEAEMA(c) | 15 | 12 | 12 | 15 |
| HEMA(b) | — | 11 | 11 | — |
| 2MAEO8(b) | — | — | — | 1 |
| 2MAEO3(b) | — | 1 | 1 | — |
| I35DP(d) | 2 | 1 | — | — |
| TMSiMA(d) | — | — | 1 | — |
| DAIB | 0-8 | 0.8 | 0.8 | — |
| AIP | — | — | — | 0.8 |
| MIBK | 300 | — | — | 300 |
| Acetone | — | 300 | 300 | — |

The respective abbreviations in Tables 3 to 5 stand for the following compounds.

C4FMA (a): $C_4F_9C_2H_4OCOC(CH_3)=CH_2$,

MAEO9(b): $CH_2=C(CH_3)COO(C_2H_4O)_9CH_3$ (the length of the ethylene oxide (hereinafter referred to as EO) chain is averaged), MAEO5PO2 (b): $CH_2=C(CH_3)COO(C_2H_4O)_5(C_3H_6O)_2H$ (the length of the propylene oxide (hereinafter referred to as PO) chain is averaged), IEO12M (b): $CH_2=C(CH_3)COOC_2H_4NHCOOC_2H_4O)_{12}CH_3$ (the length of the EO chain is averaged), DMAEMA(c): N,N-dimethylaminoethyl methacrylate, HEA(b): 2-hydroxyethyl acrylate, HBA(b): 4-hydroxybutyl acrylate, 2MAEO14 (b): $CH_2=C(CH_3)COO(C_2H_4O)_{14}COC(CH_3)=CH_2$ (the length of the EO chain is averaged), 2MAEO4 (b): $CH_2=C(CH_3)COO(C_2H_4O)_4COC(CH_3)=CH_2$, 2MAEO3 (b): $CH_2=C(CH_3)COO(C_2H_4O)_3COC(CH_3)=CH_2$, 2AEE(b): $CH_2=CHCOOCH_2CH(OH)CH_2OCH_2CH(OH)OCH_2CH(OH)CH_2OCOCH=CH_2$, TMASiMA(d): 3-methacryloylpropyltrimethoxysilane Vac(other): vinyl acetate, I35DP(d): 3,5-dimethylpyrazole adduct of 2-isocyanatoethyl (meth)acrylate.

Example 23

Polymerization was carried out in the same manner as in Example 7 except that $C_8F_{17}OCOC(CH_3)=CH_2$ was used instead of C6FMA. The resulting copolymer solution was separated into two layers and gave an instable aqueous dispersion.

Example 24

Polymerization was carried out in the same manner as in Example 1 except that $C_aF_{2a+1}OCOCH=CH_2$ (a is 9 on average) was used instead of C6FMA. The resulting copolymer solution had a low solid content, and the yield of the copolymer was about 70%.

Example 25

An aqueous dispersion was prepared in the same manner as in Example 1 except that 73.2 g of C6FMA and 37.4 g of vinylidene fluoride (hereinafter referred to as VdCl(other)) were used instead of C6FMA.

Example 26

An aqueous dispersion was prepared in the same manner as in Example 1 except that VdCl(other) was used instead of MAEO8. The resulting aqueous dispersion was not stable enough and, upon standing, deposited sediment, which could not be dispersed again even when forcibly stirred.

Example 27

A commercially available aqueous dispersion of a cationic acrylic polymer containing perfluorooctanesulfonamido groups, "Scotchban FC845 (product name, manufactured by 3M)" was used.

Example 28

A commercially available aqueous dispersion of an anionic polyurethane containing perfluoropolyether groups, "Fluorolink PT5060 (product name, manufactured by Ausimont)" was used.

Example 29

A commercially available aqueous dispersion of an anionic polymer containing perfluoropolyether groups and phosphate groups, "Fluorolink PT5045 (product name, manufactured by Ausimont)" was used.

Example 30

A commercially available aqueous dispersion of a cationic acrylic polymer containing perfluoroalkyl groups having C8 or longer carbon chains, "Foraperle 321 (product name, manufactured by ATOFINA Chemicals, Inc.)" was used.

TABLE 6

|  | Ex. | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Kit | 8 | 8 | 10 | 9 | 8 | 10 | 9 | 10 | 9 | 8 |
| Salad oil | ◯ | ◯ | ◯ | ◯ | ◯ | ◯ | ◯ | ◯ | ◯ | ◯ |
| Hot salad oil | ◯ | ◯ | ◯ | — | ◯ | — | ◯ | ◯ | — | — |
| Mixed oil | ◯ | ◯ | ◯ | ◯ | ◯ | ◯ | ◯ | ◯ | — | — |

TABLE 7

|  | Ex. | | | | | | | | | |
| --- | --- | --- | --- | --- | --- | --- | --- | --- | --- | --- |
|  | 11 | 12 | 13 | 14 | 15 | 16 | 17 | 18 | 19 | 20 |
| Kit | 9 | 10 | 10 | 9 | 10 | 9 | 10 | 10 | 10 | 11 |
| Salad oil | ◯ | ◯ | ◯ | ◯ | ◯ | ◯ | ◯ | ◯ | ◯ | ◯ |
| Hot salad oil | ◯ | ◯ | ◯ | ◯ | ◯ | ◯ | ◯ | ◯ | — | ◯ |
| Mixed oil | — | Δ | ◯ | ◯ | ◯ | ◯ | ◯ | ◯ | ◯ | ◯ |

TABLE 8

|  | Ex. | | | | | | | | | |
| --- | --- | --- | --- | --- | --- | --- | --- | --- | --- | --- |
|  | 21 | 22 | 23 | 24 | 25 | 26 | 27 | 28 | 29 | 30 |
| Kit | 11 | 9 | — | — | 6 | — | 12 | 6 | 6 | 11 |
| Salad oil | ◯ | ◯ | — | — | Δ | — | ◯ | ◯ | X | ◯ |
| Hot salad oil | ◯ | — | — | — | X | — | XX | XX | — | ◯ |
| Mixed oil | ◯ | ◯ | — | — | X | — | XX | XX | X | ◯ |

TABLE 9

| | Ex. | | | | | | | | | |
|---|---|---|---|---|---|---|---|---|---|---|
| | 1 | 2 | 3 | 5 | 11 | 17 | 18 | 27 | 28 | 29 | 30 |
| Chicken oil | ○ | ○ | ○ | ○ | ○ | ○ | ○ | ○ | ○ | X | ○ |

TABLE 10

| | Ex. | | | | | | | | |
|---|---|---|---|---|---|---|---|---|---|
| | 1 | 2 | 3 | 17 | 18 | 27 | 28 | 29 | 30 |
| RP-2 | ○ | ○ | ○ | ○ | ○ | ○ | ○ | X | ○ |

TABLE 11

| | Ex. | | | | | |
|---|---|---|---|---|---|---|
| | 1 | 3 | 17 | 18 | 28 | 30 |
| Pet food test | 1 | 0 | 0 | 0 | 80 | 0 |

TABLE 12

| | Ex. | | | | | |
|---|---|---|---|---|---|---|
| | 1 | 2 | 17 | 18 | 27 | 28 |
| Low-temperature kit | 12 | 12 | 12 | 12 | 1 | 7 |
| Low-temperature salad oil | ○ | ○ | ○ | ○ | X | ○ |

TABLE 13

| | Ex. | | | | | | | |
|---|---|---|---|---|---|---|---|---|
| | 1 | 2 | 3 | 5 | 17 | 18 | 27 | 28 |
| Water resistance | 44 | 42 | 40 | 42 | 44 | 45 | 1 | 0 |

TABLE 14

| | Ex. | | | | | | | | |
|---|---|---|---|---|---|---|---|---|---|
| | 1 | 2 | 3 | 17 | 18 | 20 | 21 | 27 | 28 | 30 |
| Water repellency | R2 | R2 | R2 | R2 | R4 | R6 | R6 | R0 | R0 | R0 |

TABLE 15

| | Ex. | | | | | |
|---|---|---|---|---|---|---|
| | 1 | 2 | 3 | 17 | 18 | 30 |
| Kit | 7 | 7 | 7 | 7 | 7 | 9 |
| Salad oil | ○ | ○ | ○ | ○ | ○ | ○ |
| Chicken oil | ○ | ○ | ○ | ○ | ○ | ○ |
| Mixed oil | ○ | ○ | ○ | ○ | ○ | ○ |
| RP-2 | ○ | ○ | ○ | ○ | ○ | ○ |
| Water resistance | 21 | 20 | 15 | 16 | 16 | 11 |
| Water repellency | R2 | R2 | R2 | R2 | R4 | R6 |

TABLE 16

| | Ex. | | | | | | |
|---|---|---|---|---|---|---|---|
| | 1 | 2 | 4 | 18 | 27 | 28 | 30 |
| Extractability [%] | 0.7 | 0.6 | ND | ND | 3.3 | 4.6 | 13.7 |

TABLE 17

| | Ex. | | | | | | | | |
|---|---|---|---|---|---|---|---|---|---|
| | 1 | 2 | 4 | 6 | 10 | 17 | 18 | 27 | 28 | 30 |
| Stability | 5- | 5- | 5- | 5- | 5- | 5- | 5- | 3 | 4- | 5- |

TABLE 18

| | Ex. | | | | | | | | | |
|---|---|---|---|---|---|---|---|---|---|---|
| | 18 | 18 | 18 | 18 | 18 | 18 | 28 | 28 | 31 | 31 |
| Polymer solid content mass % | 0.6 | 1.2 | 0.6 | 1.2 | 1.0 | 1.0 | 1.0 | 1.0 | 1.0 | 1.0 |
| S440 | | | 0.05 | 0.05 | | 0.05 | | 0.05 | | 0.05 |
| S465 | | | 0.1 | 0.1 | | | | | | |
| PVA | 1.0 | 1.0 | 1.0 | 1.0 | | | | | | |
| Oxidized starch | | | | | 1.0 | 1.0 | 1.0 | 1.0 | 1.0 | 1.0 |
| Pick-up mass % | 36 | 38 | 61 | 62 | 36 | 58 | 38 | 57 | 58 | 64 |
| Kit | 3 | 5 | 6 | 8 | 3 | 9 | 3 | 5 | 12 | 12 |
| Pet food test 2 | 43 | 22 | 0 | 0 | 6 | 0 | 100 | 100 | 100 | 100 |

The above results show that the water and oil proofing composition of the present invention can impart good oil and water resistance and water repellency sufficient for practical use to paper and non-woven fabric, irrespective of the treating method, when added internally or externally. The water and oil proofing composition of the present invention adheres well to paper, has enough endurance not to be eluted or fall off and is suitable for use in packaging or filters. In addition, the water and oil proofing composition of the present invention is mechanically stable and does not cause gumming-up in an actual treatment procedure and hardly causes contamination trouble in the treatment machine.

INDUSTRIAL APPLICABILITY

The water and oil proofing composition of the present invention can impart excellent water and oil resistance to paper and non-woven fabric. Paper and non-woven fabric treated with the water and oil proofing composition of the present invention can be used for various packaging materials, covers, acoustic materials, filters, filter materials and the like. The water and oil proofing composition of the present invention can impart excellent water and oil resistance to fibers, textiles, leather, fur and the like. The water and oil proofing composition of the present invention can impart excellent water and oil resistance to inorganic and organic powders such as silica, alumina, talc, sericin and resin powders and make them useful for cosmetics.

The entire disclosure of Japanese Patent Application No. 2004-84517 filed on Mar. 23, 2004 including specification, claims and summary is incorporated herein by reference in its entirety.

What is claimed is:

1. A water and oil proofing composition having a fluorocopolymer dispersed in an aqueous media, wherein the fluorocopolymer comprises 60 to 98 mass % of polymerized units based on the following monomer (a), from 1 to 20 mass % of polymerized units based on the following monomer (b) and from 1 to 30 mass % of polymerized units based on the following monomer (c):

monomer (a): a compound represented by $(Z-Y)_n X$, wherein

Z: a $C_{1-6}$ perfluoroalkyl group or a group represented by $C_m F_{2m+1} O(CFWCF_2 O)_d CFK$— (wherein m is an integer of from 1 to 6, d is an integer of from 1 to 4, and each of W and K is independently a fluorine atom or —$CF_3$), Y: a bivalent organic group or a single bond, n: 1 or 2, and X: a polymerizable unsaturated group provided that when n is 1, X is —$CR=CH_2$, —$COOCR=CH_2$, —$OCOCR=CH_2$, —$OCH_2$-$\phi$-$CR=CH_2$ or —$OCH=CH_2$, and when n is 2, X is =$CH(CH_2)_p CR=CH_2$, =$CH(CH_2)_p COOCR=CH_2$, =$CH(CH_2)_p OCOCR=CH_2$ or —$OCOCH=CHCOO$— (wherein R is a hydrogen atom, a methyl group or a halogen atom, $\phi$ is a phenylene group, and p is an integer of from 0 to 4), monomer (b): a compound represented by $CH_2=CR^1$-G-$(R^2 O)_q$—$R^3$, wherein $R^1$: a hydrogen atom or a methyl group, $R^2$: a $C_{2-4}$ alkylene group or an otherwise $C_{2-3}$ alkylene group in which some or all of the hydrogen atoms have been replaced by hydroxyl groups, q: an integer of from 1 to 50, G: —$COO(CH_2)_r$— or —$COO(CH_2)_r$—$NHCOO$— (wherein r is an integer of from 0 to 4, and t is an integer of from 1 to 4), and $R^3$ is at least one of an acryloyl group and a methacryloyl group, monomer (c): a compound represented by $CH_2=CR^4$-M-Q-$NR^5 R^6$ or $CH_2=CR^4$-M-Q-N(O)$R^5 R^6$, wherein $R^4$: a hydrogen atom or a methyl group, M: —COO— or —CONH—, Q: a $C_{2-4}$ alkylene group or an otherwise $C_{2-3}$ alkylene group in which some or all of the hydrogen atoms have been replaced by hydroxyl groups, and each of $R^5$ and $R^6$: a benzyl group, a $C_{1-8}$ alkyl group or an otherwise $C_{2-3}$ alkylene group in which some of the hydrogen atoms have been replaced by hydroxyl groups, or $R^5$ and $R^6$ may form a morpholino group, a piperidino group or a pyrrolidinyl group, together with a nitrogen atom.

2. The water and oil proofing composition according to claim 1, wherein the fluorocopolymer further comprises polymerized units based on the following monomer (d), and comprises from 60 to 97.9 mass % of polymerized units based on the monomer (a), from 1 to 20 mass % of polymerized units based on the monomer (b), from 1 to 20 mass % of polymerized units based on the monomer (c) and from 0.1 to 10 mass % of polymerized units based on the monomer (d):

monomer (d): a monomer other than the monomer (b) and the monomer (c), which is a (meth)acrylate having at least one functional group selected from the group consisting of an isocyanato group, a blocked isocyanato group, a urethane bond, an alkoxysilyl group, an epoxy group, an N-methylol group and an N-alkoxymethyl group and having no polyfluoroalkyl groups.

3. The water and oil proofing composition according to claim 1, wherein in $(Z-Y)_n X$ as the monomer (a), Z is a $C_{1-6}$ perfluoroalkyl group, Y is a bivalent organic group, and X is —$OCOCR=CH_2$ or —$OCOCH=CHCOO$— (wherein R is a hydrogen atom, a methyl group or a halogen atom).

4. The water and oil proofing composition according to claim 1, wherein the monomer (a) is a compound represented by $F(CF_2)_s Y^1 OCOCR=CH_2$ (wherein s is an integer of from 1 to 6, R is a hydrogen atom, a methyl group or a halogen atom, and $Y^1$ is a $C_{1-10}$ alkylene group).

5. The water and oil proofing composition according to claim 1, wherein in $CH_2=CR^1$-G-$(R^2 O)_q$—$R^3$ as the monomer (b), G is —$COO(CH_2)_r$— (wherein r is an integer of from 0 to 4), $R^2$ is a $C_{2-4}$ alkylene group, q is an integer of from 1 to 30, and $R^3$ is an acryloyl group or a methacryloyl group.

6. The water and oil proofing composition according to claim 1, wherein in $CH_2=CR^4$-M-Q-$NR^5 R^6$ or $CH_2=CR^4$-M-Q-N(O)$R^5 R^6$ as the monomer (c), M is —COO—, Q is a $C_{2-4}$ alkylene group, and $R^5$ and $R^6$ are $C_{1-8}$ alkyl groups.

7. The water and oil proofing composition according to claim 1, wherein the fluorocopolymer is obtained by polymerization using the following polymerization initiator (e):

polymerization initiator (e): an azo compound or an azoamidine compound which, itself or when decomposed, has an acute oral toxicity of at least 1000 mg/kg in rats or mice and a 10-hour half-life temperature of 30° C. or above.

8. The water and oil proofing composition of claim 1, wherein monomer (b) $R_3$ is an acryloyl group.

9. The water and oil proofing composition according to claim 1, wherein monomer (b) $R_3$ is a methacryloyl group.

10. The water and oil proofing composition of claim 1, wherein monomer (a) is $C_6F_{13}C_2H_4OCOC(CH_3)=CH_2$, monomer and monomer (c) is N,N-diethylaminoethyl methacrylate.

11. The water and oil proofing composition of claim 1, wherein monomer (a) is $C_6F_{13}C_2H_4OCOC(CH_3)=CH_2$, monomer (b) is $CH_2=C(CH_3)COO(C_2H_4O)_nCOC(CH_3)=CH_2$, and monomer (c) is N,N-diethylaminoethyl methacrylate.

12. The water and oil proofing composition of claim 1, wherein monomer (a) is at least one selected from the group consisting of $C_6F_{13}C_2H_4OCOC(CH_3)=CH_2$ and $C_4F_9C_2H_4OCOC(CH_3)=CH_2$; monomer.

* * * * *

UNITED STATES PATENT AND TRADEMARK OFFICE
CERTIFICATE OF CORRECTION

PATENT NO.         : 7,485,688 B2
APPLICATION NO. : 11/524918
DATED              : February 3, 2009
INVENTOR(S)        : Maekawa et al.

It is certified that error appears in the above-identified patent and that said Letters Patent is hereby corrected as shown below:

On the title page, Item (54), and Column 1, the title information is incorrect. Item (54) and Column 1 should read:

Item -- (54) WATER AND OIL PROOFING COMPOSITION --

Signed and Sealed this

Thirty-first Day of March, 2009

JOHN DOLL
*Acting Director of the United States Patent and Trademark Office*